United States Patent
Smit

(10) Patent No.: US 9,591,944 B2
(45) Date of Patent: Mar. 14, 2017

(54) COFFEE FILTER HOLDER AND COFFEE MAKER

(75) Inventor: Gerard Clement Smit, Amerongen (NL)

(73) Assignee: SMITDESIGN B.V., Amerongen (NL)

( * ) Notice: Subject to any disclaimer, the term of this patent is extended or adjusted under 35 U.S.C. 154(b) by 549 days.

(21) Appl. No.: 13/426,258

(22) Filed: Mar. 21, 2012

(65) Prior Publication Data

US 2013/0247776 A1    Sep. 26, 2013

(51) Int. Cl.
A47J 31/46    (2006.01)
A47J 31/44    (2006.01)

(52) U.S. Cl.
CPC .................................... A47J 31/44 (2013.01)

(58) Field of Classification Search
CPC .... A47J 31/06; A47J 31/0605; A47J 31/0684; A47J 36/40; A47J 2031/00; A47J 2031/06; A47J 41/00; A47J 41/0005; A47J 41/0011; A47J 41/0016; A47J 41/0027; A47J 2031/0694
USPC ... 99/304, 289 D, 289 P, 295, 298, 299, 306
See application file for complete search history.

(56) References Cited

U.S. PATENT DOCUMENTS

| | | | |
|---|---|---|---|
| 3,374,897 A | | 3/1968 | Martin |
| 4,893,552 A | | 1/1990 | Wunder et al. |
| 4,895,656 A | * | 1/1990 | Smit .............................. 210/481 |
| 5,102,546 A | * | 4/1992 | Salomon ........................ 210/469 |
| 5,957,036 A | * | 9/1999 | Warner et al. .................. 99/299 |
| 5,964,141 A | * | 10/1999 | Andrew et al. ................. 99/280 |
| 7,024,984 B2 | * | 4/2006 | Leung et al. ................... 99/299 |
| 2011/0048241 A1 | | 3/2011 | Smit |

FOREIGN PATENT DOCUMENTS

| | | |
|---|---|---|
| CA | 2121998 A1 | 10/1995 |
| DE | 3743050 C1 | 2/1989 |
| NL | 1002420 C2 | 8/1997 |
| WO | WO 02/49487 A1 | 6/2002 |
| WO | WO 2007/106947 A1 | 9/2007 |

* cited by examiner

Primary Examiner — Tu B Hoang
Assistant Examiner — Diallo I Duniver
(74) Attorney, Agent, or Firm — Birch, Stewart, Kolasch & Birch, LLP

(57) ABSTRACT

A coffee filter holder includes a funnel wall, a substantially flat bottom wall having an outer edge and a coffee brew outlet, a drip-stop valve assembly that can be brought in an opened and a closed condition. The drip-stop valve assembly includes a valve member mounted on a blade spring connected to the bottom wall, and an actuator lever slideably connected to the bottom wall. The actuator lever includes an integral piece of sheet material with a first end that extends beyond the outer edge of the bottom wall so as to be engageable by hand and having a second end positioned under the substantially flat bottom wall to engage the valve member carrier to bring valve member from the opened position to the closed position and vice versa.

15 Claims, 4 Drawing Sheets

COFFEE FILTER HOLDER AND COFFEE MAKER

TECHNICAL FIELD

The invention filter holder for a drip brew coffee maker. More particularly, the invention relates to a filter holder having a drip-stop valve. The invention also relates to a coffee maker.

BACKGROUND

A filter holder having a drip-stop valve is known in the art and is, for example disclosed in US-2011/0048241-A1. The known drip-stop valve functions properly but required a double walled construction of the filter holder, namely an inner funnel wall that bounds an inner space in which a tapered coffee filter is placed and an outer wall that surrounds the inner wall at a lower part of the filter holder to provide a support ridge for stable placing of the filter holder on a filter holder support bracket of the coffee maker. Apart from providing a stable support ridge, the outer wall of the known filter holder is also used to slideably carry an actuator knob of the known drip-stop valve.

In the field of drip brew coffee makers, filter holders having a substantially flat filter bottom wall for brewing filters having a flat bottom are also well known. An example of such filter holder having a funnel wall and substantially flat bottom wall is disclosed in U.S. Pat. No. 3,374,897. This known filter holder does not have a drip-stop valve and is not placed on a filter holder support bracket of a coffee maker. Instead, the known filter has an annular flange that is formed integrally with the upper end of the funnel wall for slidable mounting on support angels that are carried by the underside of a bottom wall that forms a part of a hood of a coffee maker.

SUMMARY OF THE INVENTION

The present disclosure is directed to a filter holder having a substantially flat bottom wall for brewing filters having a flat bottom that can be placed on a filter holder support bracket of a coffee maker.

More particularly, the object is to provide a filter holder having a substantially flat bottom with a drip stop valve that may be placed on an existing coffee maker that has a filter holder support bracket without any adaptation of the filter holder support bracket of the coffee maker.

To that end, the invention provides a coffee filter holder including:
a funnel wall;
a substantially flat bottom wall having an outer edge and a coffee brew outlet;
a drip-stop valve assembly that can be brought in an opened and a closed condition, the drip-stop valve assembly including:
  a valve member that, in the closed condition of the drip-stop valve assembly, is in a closed position wherein the valve member closes off the coffee brew outlet, wherein the valve member, in the opened condition of the drip-stop valve assembly, is in an opened position that allows coffee extract to be discharged from the coffee brew outlet;
  a valve member carrier consisting of a blade spring that has a first end and a second end opposite the first end, the valve member carrier being connected to the bottom wall adjacent its first end and carrying the valve member adjacent its second end;
  an actuator lever slideably connected to the bottom wall and being in engagement with the valve member carrier and configured to bring valve member from the opened position to the closed position and vice versa, the actuator lever including an integral piece of sheet material including a first flat part extending parallel to the substantially flat bottom wall, the first flat part having a first end that extends beyond the outer edge of the bottom wall so as to be engageable by hand and having a second end that is positioned under the substantially flat bottom wall.

The filter holder according to the invention can be placed on a filter holder support bracket without any problems because the actuator lever is made of a piece of sheet material. Thus, the thickness of the actuator lever will be very limited and no special provisions on the filter holder support bracket have to be provided to properly position the filter holder according to the invention on the support bracket. Additionally, no double wall construction of the filter holder is necessary to mount an actuator knob on as is the case with the prior art filter holder with drip-stop valve.

The invention also provides a coffee maker including:
a housing;
a filter holder support bracket connected to the housing; and
a filter holder according to the invention.

Such a coffee maker includes the benefits that have been described in relation to the disclosed filter holder.

Further embodiments of the filter holder are defined in the dependent claims and will be further elucidated by reference to an example that is shown in the drawings.

DETAILED DESCRIPTION

Figure 1:
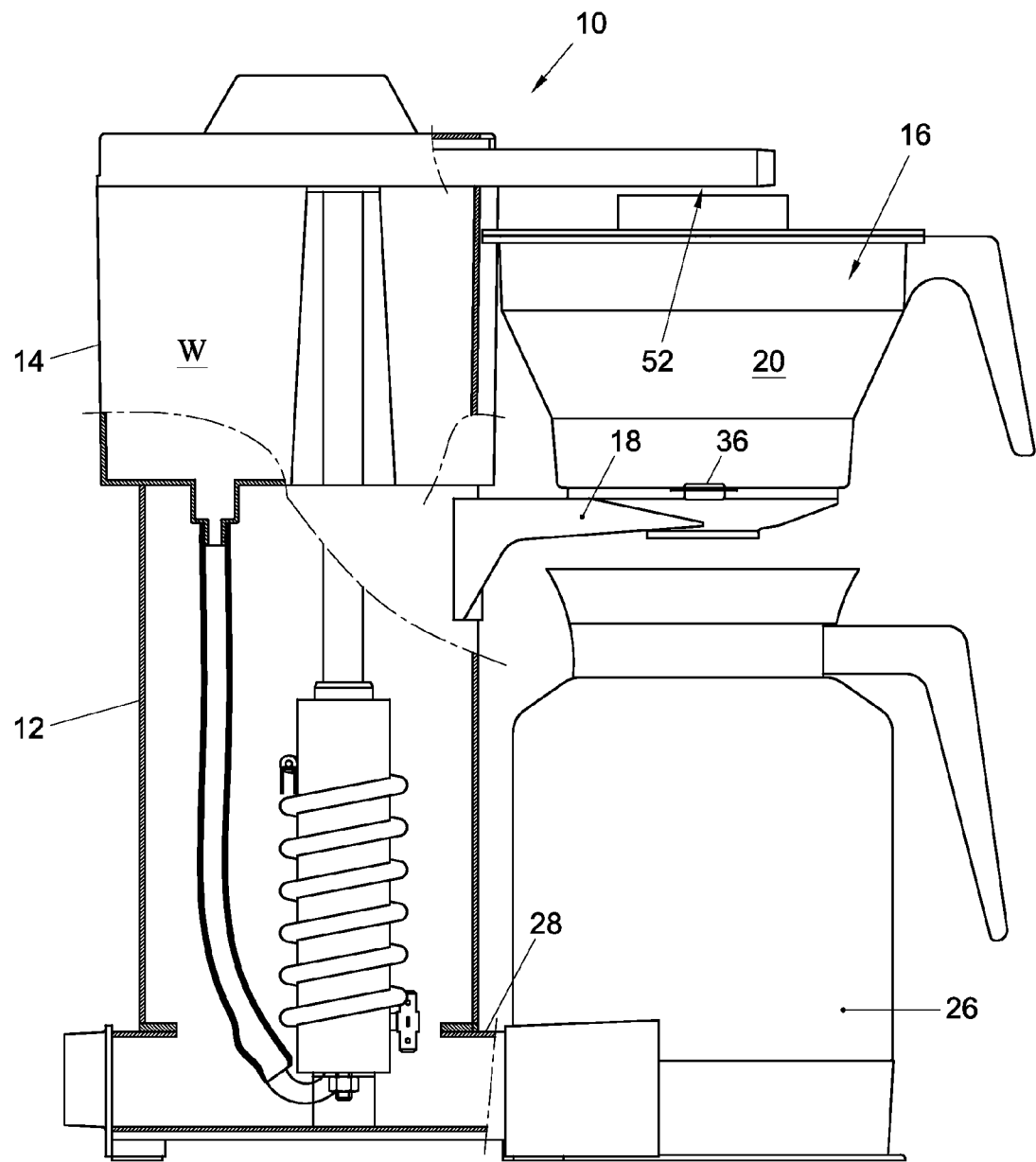
FIG. 1 shows a side-elevation view partially in cross section of an example of an embodiment of a coffee maker and a filter holder.

FIG. 1 shows an example of a coffee maker 10. The coffee maker includes a housing 12 and a water reservoir 14. A filter holder 16 is placeable on a filter holder support bracket 18 that may be a part of or connect to the housing 12. The filter holder 16 has a funnel wall 20 and a substantially flat bottom wall 22 and is configured to hold a substantially frusto-conical filter. As is well known, the filter holder 16 has a brew outlet 24 at the bottom thereof. In the present example, the filter holder 16 is placeable on the filter holder support bracket 18 of the coffee maker 10. A carafe 26 is placed in or on a base part 28 of the housing 12 of the coffee maker 10. The carafe 26, that may be a thermal carafe 26 or alternatively a glass carafe, may be positioned underneath the brew outlet of the filter holder 16.

During operation the user will fill the water reservoir 14 with water W. When the coffee maker 10 is switched on a heating element will heat the water. The heated water will enter the filter holder 16. The heated water will subsequently trickle through the coffee in the coffee filter in the filter holder 16 and leave the filter holder 16 via the brew outlet 24 of the filter holder 16. This is all a very well known and does not have to be elucidated any further.

Figure 2:
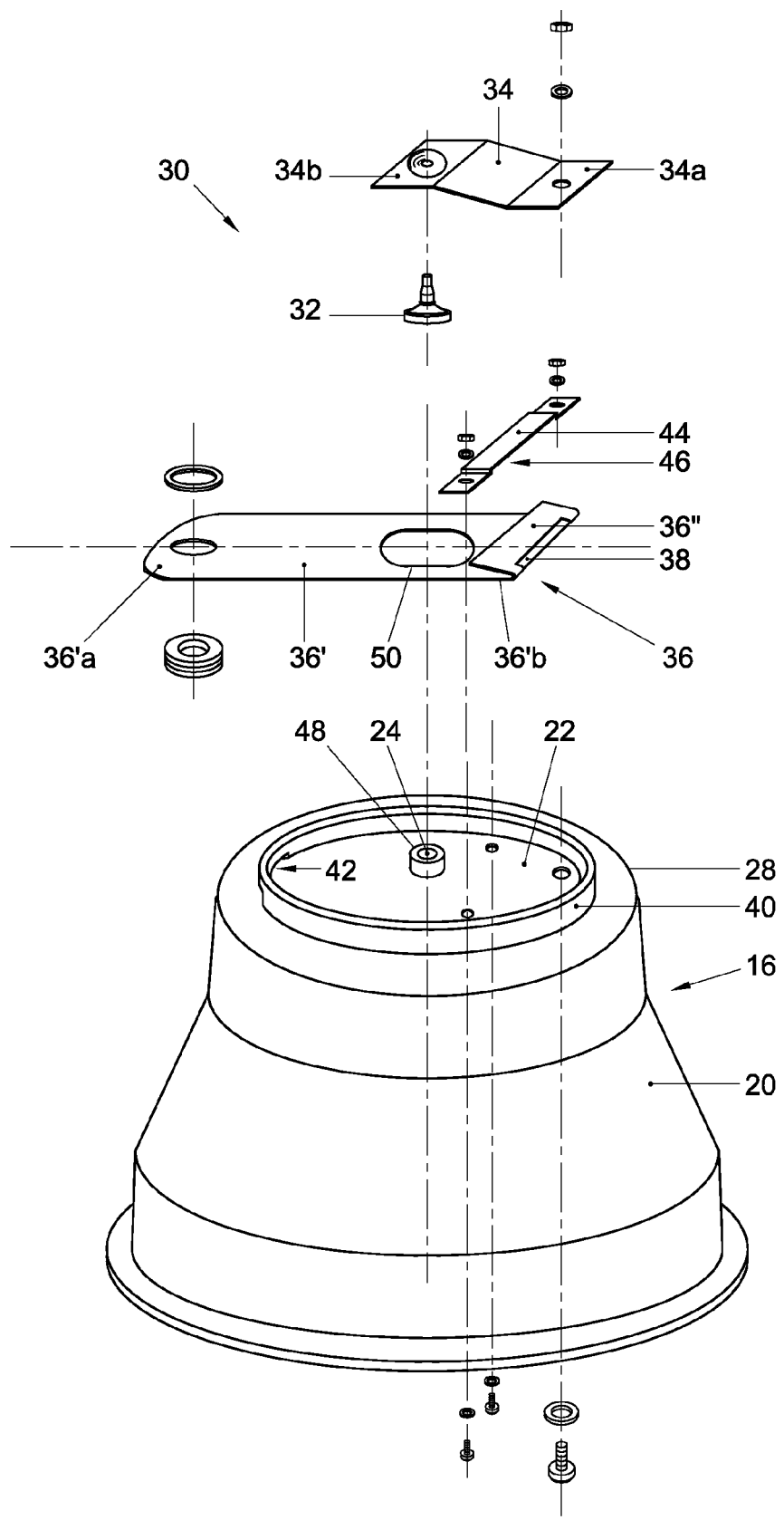
FIG. 2 shows an exploded view of an example of an embodiment of a filter holder.
Figure 3:
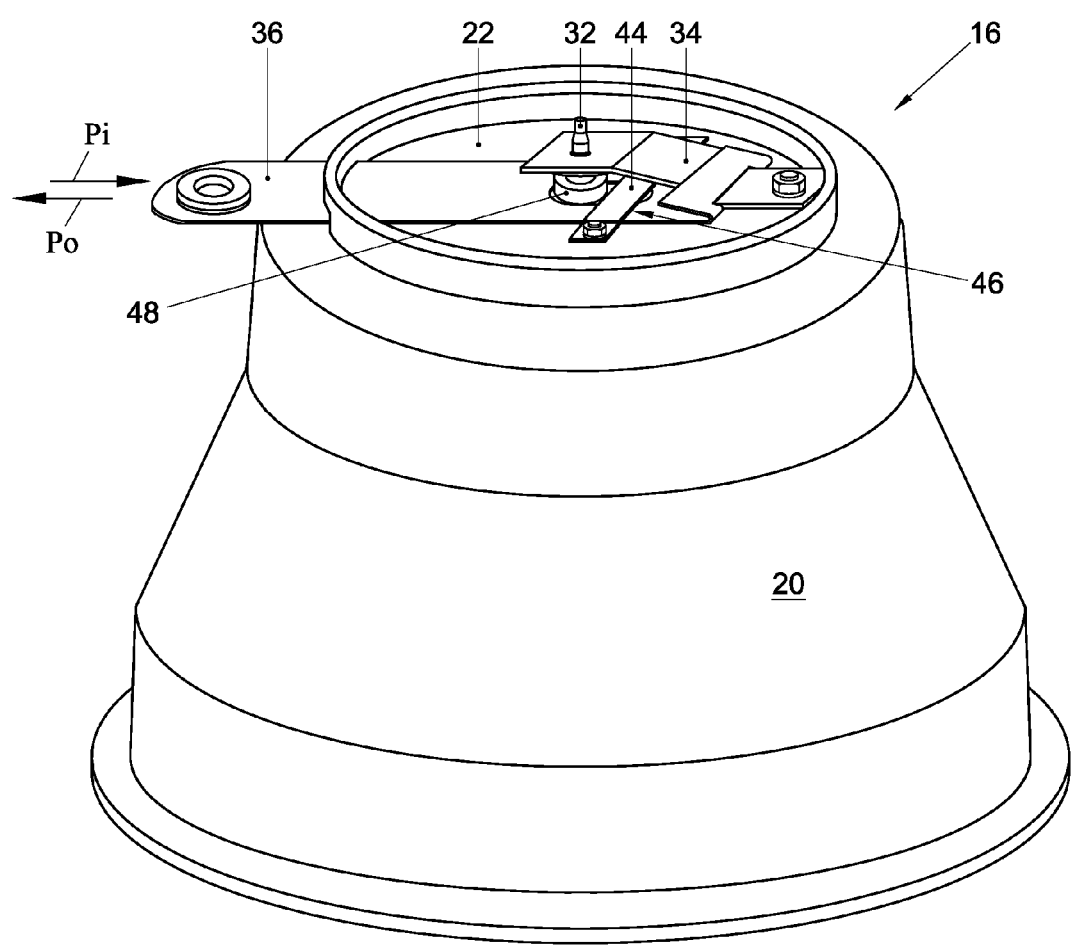
FIG. 3 shows a perspective view of the example of FIG. 2 with the drip-stop valve in the open condition.
Figure 4:
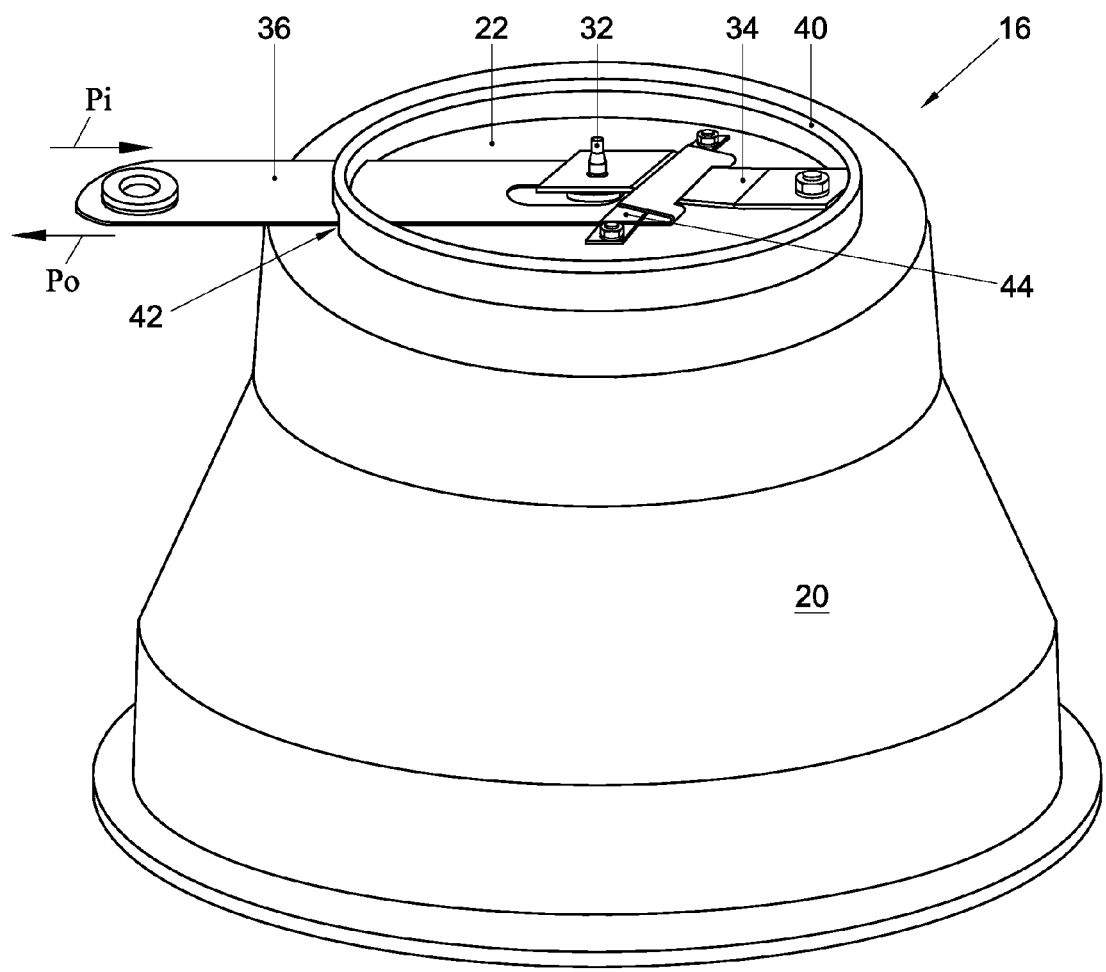
FIG. 4 shows a perspective view of the example of FIG. 2 with the drip-stop valve in the closed condition.

FIGS. 2-4 show an example of an embodiment of a coffee filter holder 16 in open condition, a closed condition and in an exploded view. The filter holder 16 generally includes a funnel wall 20 and a substantially flat bottom wall 22 having an outer edge 28 and a coffee brew outlet 24. The filter holder includes a drip-stop valve assembly 30 that can be brought in an opened and a closed condition. The drip-stop valve assembly 30 includes a valve member 32 that, in the closed condition of the drip-stop valve assembly 30, is in a closed position wherein the valve member 32 closes off the coffee brew outlet 24. In the opened condition of the drip-stop valve assembly 30, the valve member 32 is in an opened position that allows coffee extract to be discharged from the coffee brew outlet 24. The discharge valve assembly 30 also includes a valve member carrier 34 consisting of a blade spring that has a first end 34a and a second end 34b opposite the first end 34a. The valve member carrier 34 is connected to the bottom wall 22 adjacent its first end 34a and carries the valve member 32 adjacent its second end 34b. The connection may be effected in various ways, for example, by means of a nut/bolt-assembly as shown, a clamp connection, a glue connection, a weld connection or combinations thereof. The drip-stop valve assembly 30 additionally includes an actuator lever 36 that is slideably connected to the bottom wall 22 and that is in engagement with the valve member carrier 34. The actuator lever 36 is configured to bring valve member 32 from the opened position (see FIG. 3) to the closed position (see FIG. 4) and vice versa. The actuator lever 36 including an integral piece of sheet material that includes a first flat part 36' extending parallel to the substantially flat bottom wall 22. The first flat part 36' has a first end 36'a that extends beyond the outer edge 28 of the bottom wall 22 so as to be engageable by hand. A second end 36'b of the first flat part 36' is positioned under the substantially flat bottom wall 22.

By virtue of the fact that the actuator lever 36 is manufactured from an integral piece of sheet material, it is feasible to place the filter holder 16 on a filter holder support bracket 18 of a coffee maker 10 without special provisions on the filter holder support bracket 18. By virtue of the thin sheet material of the actuator lever 36 that protrudes beyond the outer edge 28 of the bottom wall 22, the filter holder 16 may be properly positioned on the filter holder support bracket 18 without any or barely any sloping positioning of the filter holder 16. Additionally, no double wall construction for mounting the actuator is necessary as was the case with the prior art filter holder that is briefly described in the background section of the present application.

In an embodiment, of which an example is shown in FIGS. 2-4, the integral piece of sheet material of the actuator lever 36 includes a second flat part 36" connected to the second end 36'a via a sharp bend. At the bend a slit 38 in the piece of sheet material is provided that extends parallel to the bend. The blade spring constituting the valve member carrier 34 extends through the slit 38.

When the actuator lever 36 is slid along its length by pulling it radially outwardly along arrow Po, the slit 38 moves along the valve member carrier 34 and the actuator lever 36, more particularly a lower edge of the slit 38 and the second flat part 36" of the actuator lever 36, presses the valve member carrier 34 towards the brew outlet 24 to bring the valve member 32 into engagement with the brew outlet 24 in order to bring the drip assembly 30 into the closed position. When the actuator lever 36 is slid along its length by pushing it radially inwardly along arrow Pi, the slit 38 again moves along the valve member carrier 34 and the actuator lever 36, more particularly an upper edge of the slit 38, pushes or allows the valve member carrier 34 to move away from the brew outlet 24.

In an alternative example of this embodiment, the closing of the valve member 32 may be accomplished by pushing the actuator lever 36 radially inwardly and the opening of the valve member 32 may be accomplished by pulling the actuator lever 36 radially outwardly. This alternative example may, for example, be effected by reversing the connection position of the valve member carrier 34 to the bottom wall in a diametrically opposite position relative to the brew outlet 24 than the connection position that is shown in the example of the drawings.

In an embodiment, of which an example is shown in the drawings, the bottom wall 22 may include a first rim 40 extending downwardly from the bottom wall 22. A first guiding slit 42 may be provided in the first rim 40 and may extend parallel to the bottom wall 22. The integral piece of sheet material of the actuator lever 36 may extend through the first guiding slit 42 so that it is slideable through the first guiding slit 42.

The first rim 40 may be provided to help positioning the filter holder 16 on the filter holder support bracket 18. Thus, it is easy to centrally position the filter holder 16 under the spray head 52 of the coffee maker. By the provision of the first guiding slit 42 the actuator lever 36 may be guided to limit its movement to a sliding movement. It is advantageous when an upper edge of the first guiding slit 42 is flush with the downwardly directed side of the bottom wall 22. Thus, the actuator lever 36 abuts against the downwardly directed side of the bottom wall 22 at the first rim 40.

In order to provide further guidance to the actuator lever 36, an embodiment of the filter holder 16 may include a bracket 44 that is connected with the bottom wall 22 so that between the bracket 44 and the bottom wall 22 a second guiding slit 46 is formed. The connection may be effected by means of nut/bolt-assemblies as shown, by a clamp connection, a glue connection, a weld connection or combinations thereof. An example of such an embodiment is shown in the drawings. The integral piece of sheet material of the actuator lever 36 may extend through the second guiding slit 46 so that it is slideable through the second guiding slit 46.

Preferably, an embodiment of the filter holder 16 comprises both a first guiding slit 42 and a second guiding slit 46 so that the actuator lever 36 is guided in a stable manner so that only a longitudinal movement of the actuator lever 36 is feasible.

In an embodiment, of which an example is shown in the drawings, the bottom wall may include a brew outlet rim 48 surrounding the brew outlet 24 and extending downwardly from the bottom wall 22. The brew outlet rim has a free end 48a that forms a seat for the valve member 32. In such an embodiment, the piece of sheet material of the actuator lever 36 may include a slotted hole 50 having a width that is equal to or slightly larger than the external diameter of the brew outlet rim 48. The slotted hole 50 may have a length that defines the end positions of the sliding movement of the actuator lever 36. In a mounted condition of the drip-stop assembly 30, the brew outlet 48 rim extends through the slotted hole 50. The embodiment with the slotted hole 50 and the brew outlet rim 48 provides two stops to limit the stroke of the actuator lever 36 in a very efficient manner without the need of providing any additional elements. The brew outlet rim 48 is preferred anyway because of the improved seal that may be obtained between such a outlet rim 48 and the valve member 32.

In a practical embodiment that is durable, the piece of sheet material of the actuator lever 36 may be a piece of sheet metal.

In an embodiment, of which an example is shown in the drawings, the blade spring that constitutes the valve member carrier 34 may include a bend so that the valve member 32 is biased into the open position. Such a biased valve member carrier 34 has the advantage that the chance that the valve member 32 remains in the closed position inadvertently is minimized.

As stated before, the invention also provides a coffee maker including a housing, a filter holder support bracket connected to the housing, and a filter holder as disclosed.

Although illustrative embodiments of the present invention have been described above, in part with reference to be accompanying drawings, it is to be understood that the invention is not limited to these embodiments. Variations to the disclosed embodiments can be understood and effected by those skilled in the art in practicing the claimed invention from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combined in any suitable manner to form new, not explicitly described embodiments.

The invention claimed is:

1. A coffee filter holder including:
    a funnel wall defining an upper edge bounding an inlet opening and defining a lower edge;
    a bottom wall having an outer edge, the bottom wall connected to the lower edge of the funnel wall and having a coffee brew outlet; and
    a drip-stop valve assembly that can be brought in an opened and a closed condition, the drip-stop valve assembly including:
        a valve member that, in the closed condition of the drip-stop valve assembly, is in a closed position wherein the valve member closes off the coffee brew outlet, wherein the valve member, in the opened condition of the drip-stop valve assembly, is in an opened position that allows coffee extract to be discharged from the coffee brew outlet;
        a blade spring having a first end and a second end opposite the first end, the blade spring being connected to the bottom wall adjacent the first end of the blade spring and the valve member connected to the blade spring adjacent the second end of the blade spring; and
        an actuator lever slideably connected to the bottom wall and being in sliding engagement with the blade spring and configured to bring valve member from the opened position to the closed position and vice versa, the actuator lever comprising an integral piece of sheet material including a first flat part extending parallel to the bottom wall, the first flat part having a first end that extends beyond the outer edge of the bottom wall so as to be engageable by hand and having a second end that is positioned under the substantially flat bottom wall.

2. The coffee filter holder according to claim 1, wherein the integral piece of sheet material of the actuator lever includes:
    a second flat part connected to the second end of the first part via a sharp bend; and
    a slit in the piece of sheet material at the bend and parallel to the bend;
    wherein the blade spring extends through the slit.

3. The coffee filter holder according to claim 1, wherein the bottom wall includes:
    a first rim extending downwardly from the bottom wall;
    a first guiding slit being provided in the first rim and extending parallel to the bottom wall;
    wherein the actuator lever extends through the first guiding slit so that it is slideable through the first guiding slit.

4. The coffee filter holder according to claim 1, including:
    a bracket that is connected with the bottom wall so that between the bracket and the bottom wall a second guiding slit is formed;
    wherein the integral piece of sheet material of the actuator lever extends through the second guiding slit so that it is slideable through the second guiding slit.

5. The coffee filter holder according to claim 1, wherein the bottom wall includes:
    a brew outlet rim surrounding the brew outlet and extending downwardly from the bottom wall, the brew outlet rim having a free end that forms a seat for the valve member;
    wherein the piece of sheet material of the actuator lever includes a slotted hole having
        a width that is equal to or slightly larger than the external diameter of the brew outlet rim;
        a length that defines the end positions of the sliding movement of the actuator lever
        wherein the brew outlet rim extends through the slotted hole.

6. The coffee filter holder according to claim 1, wherein the piece of sheet material of the actuator lever is a piece of sheet metal.

7. The coffee filter holder according to claim 1, wherein the blade spring includes a bend so that the valve member is biased into the open position.

8. A coffee maker including:
    a housing;
    a filter holder support bracket connected to the housing; and
    a filter holder according to claim 1.

9. A coffee maker including:
    a housing;
    a filter holder support bracket connected to the housing; and
    a filter holder according to claim 2.

10. A coffee maker including:
    a housing;
    a filter holder support bracket connected to the housing; and
    a filter holder according to claim 3.

11. A coffee maker including:
    a housing;
    a filter holder support bracket connected to the housing; and
    a filter holder according to claim 4.

12. A coffee maker including:
    a housing;

a filter holder support bracket connected to the housing; and a filter holder according to claim 5.

13. A coffee maker including:

a housing;

a filter holder support bracket connected to the housing; and a filter holder according to claim 6.

14. A coffee maker including:

a housing;

a filter holder support bracket connected to the housing; and a filter holder according to claim 7.

15. A coffee filter holder including:

a funnel wall defining an upper edge bounding an inlet opening and defining a lower edge;

a bottom wall having an outer edge, the bottom wall connected to the lower edge of the funnel wall and having a coffee brew outlet; and a drip-stop valve assembly that can be brought in an opened and a closed condition, the drip-stop valve assembly including:

a valve member that, in the closed condition of the drip-stop valve assembly, is in a closed position wherein the valve member closes off the coffee brew outlet, wherein the valve member, in the opened condition of the drip-stop valve assembly, is in an opened position that allows coffee extract to be discharged from the coffee brew outlet;

a blade spring having a first end and a second end opposite the first end, the blade spring being connected to the bottom wall adjacent the first end of the blade spring and the valve member connected to the blade spring adjacent the second end of the blade spring, the blade spring having a bent configuration for biasing the valve member in the opened position in which the valve member is spaced apart from the coffee brew outlet; and an actuator lever slideably connected to the bottom wall and being in sliding engagement with the blade spring, the actuator lever comprising an integral piece of sheet material including a first flat part extending parallel to the bottom wall, the first flat part having a first end that extends beyond the outer edge of the bottom wall so as to be engageable by hand and having a second end that is positioned under the substantially flat bottom wall, the actuator lever including a slit in the piece of sheet material, the blade spring extending through the slit thereby forming an engagement between the actuator lever and the blade spring, wherein a sliding movement of the actuator lever along the bottom wall displaces the slit relative to the blade spring thereby moving the second end of the blade spring towards and away from the coffee brew outlet so as to bring valve member between an opened and closed position.

\* \* \* \* \*